United States Patent [19]

Minovitch

[11] Patent Number: 5,271,583
[45] Date of Patent: Dec. 21, 1993

[54] AUTOMATIC METHOD AND OPERATING SYSTEM FOR SPACE CONSTRUCTION

[76] Inventor: Michael A. Minovitch, 2832 St. George Street, Apt. 6, Los Angeles, Calif. 90027

[21] Appl. No.: 881,300

[22] Filed: May 12, 1992

[51] Int. Cl.$^5$ .............................................. B64G 1/10
[52] U.S. Cl. ................................ 244/159; 264/166; 198/804
[58] Field of Search .......................... 244/159, 158 R; 264/166, 209.2; 52/653, 748, 234, 121; 198/804, 819

[56] References Cited

U.S. PATENT DOCUMENTS

| | | | |
|---|---|---|---|
| 3,255,284 | 6/1966 | Meislohn | 264/166 |
| 3,284,259 | 11/1966 | Galloway et al. | 264/166 |
| 4,472,335 | 9/1984 | Meyer et al. | 264/166 X |
| 4,587,777 | 5/1986 | Vasques et al. | 52/108 X |
| 4,601,389 | 7/1986 | Minovitch | 198/804 |
| 4,730,797 | 3/1988 | Minovitch | 244/159 |
| 4,758,397 | 7/1988 | Schreiner | 264/166 |
| 5,132,070 | 7/1992 | Paul et al. | 264/166 X |

Primary Examiner—Margaret A. Focarino
Assistant Examiner—Christopher P. Ellis
Attorney, Agent, or Firm—Christie, Parker & Hale

[57] ABSTRACT

A high-speed automated method and operating system is disclosed for constructing continuous-walled tubular structures in space having unlimited dimensions. The system comprises a relatively short tubular conveyor with a flexible endless conveying surface sliding in a longitudinal direction around a smooth cylindrical inner guide tube, and a plurality of wrapping wheels containing wrapping material moving in transverse directions. By moving the conveyor and simultaneously moving the wrapping wheels around the conveyor, sheets of material are wrapped around the outer conveying surface made firm by the inner guide tube to continuously manufacture a rigid multi-layered laminated walled cylindrical structure with an inside diameter equal to the outside diameter of the tubular conveyor. By varying the conveyor speed-to-wrapping wheel speed ratio, any wall thickness is obtained. The wrapping material is rolled into spools, mounted inside cartridges, and loaded into the wrapping wheels for easy insertion and replacement. Thus, the manufacturing process can be continued indefinitely to obtain a tubular structure having any dimensions desired. Since the sheets of wrapping material are transported to orbit in rolls with very high packing density, the machine can construct huge structures in orbit with relatively few trips.

32 Claims, 3 Drawing Sheets

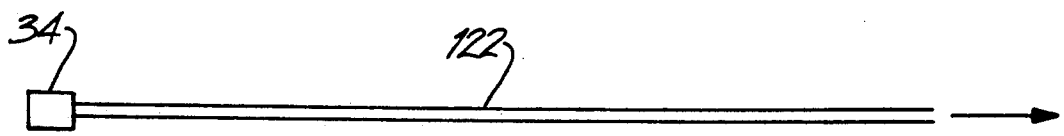
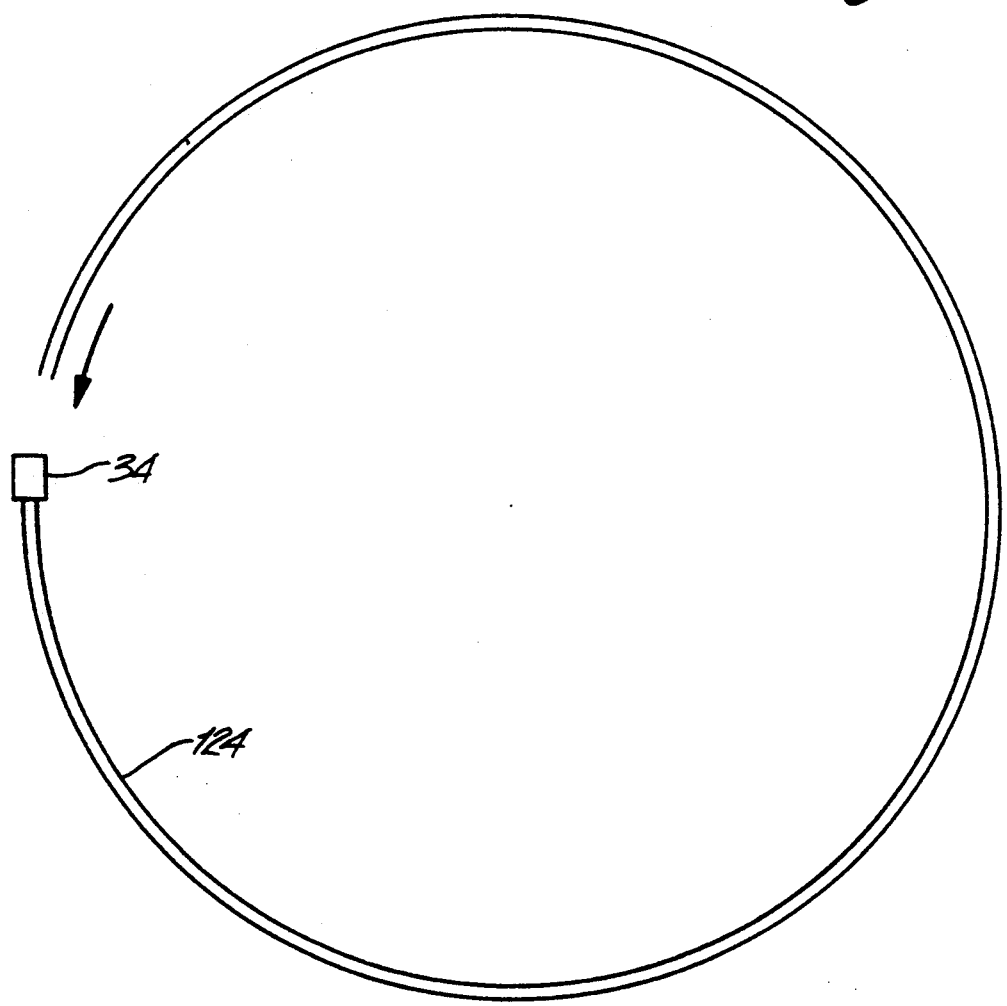

AUTOMATIC METHOD AND OPERATING SYSTEM FOR SPACE CONSTRUCTION

BACKGROUND

In my previous U.S. Pat. No. 4,730,797 entitled "Inflatable Core Orbital Construction Method and Space Station" filed Aug. 12, 1985, I disclosed an automated method and operating system for constructing large continuous-walled structures in orbit by robotics. In that method, a lightweight, non-elastic, inflatable surface with thin flexible walls is transported to orbit and inflated like a balloon to form a semi-rigid surface. The surface is then used as a guide for constructing the wall of the structure by wrapping the inflated surface with long sheets of flexible high-strength material until the desired wall thickness is obtained. The wrapping process is accomplished automatically by a wrapping machine.

Unfortunately, that method of orbital construction had a number of operational problems. For example, the diameter could not be very large because the inflation pressure would generate stress that could easily exceed the stress limitations of the inflated surface. Since the pressure had to be relatively low, it did not serve very well as a firm guide surface for the wrapping material and could be deformed during the wrapping process. The inflated surface was also subject to accidental deflation before it could be completely wrapped and made rigid. It was also limited to finite dimensions. But the most serious defect inherent in that method of orbital construction was the fact that the wrapping machine had to move around the inflated surface along a precise predetermined path while it wrapped the material around it. This was a technically difficult and tedious process since the machine had to move over the surface many times to build up the wall thickness by wrapping it with many layers of wrapping material. Consequently, the machine required considerable time to construct the structure and it required considerable monitoring to make sure it was moving along the required path.

Although the present system is also based on the use of wrapping material for wall building, it represents an entirely new system and operating method because it does not require any preinflated guide surface and does not require the machine to travel anywhere during the construction process.

BRIEF SUMMARY OF THE INVENTION

Thus, in the practice of this invention according to a presently preferred embodiment, there is provided a high-speed economical method and operating system for automatically constructing large tubular structures in orbit with essentially unlimited dimensions. The system comprises a relatively short tubular conveyor with an inner and outer endless flexible thin conveying medium moving in a longitudinal direction around a smooth cylindrical guide tube, and a plurality of wrapping wheels containing long thin sheets of high-strength wrapping material moving in transverse directions around the outside of the conveyor.

The tubular conveyor comprises a fixed rigid smooth-surfaced cylindrical guide tube with any desired radius. The endless flexible conveying medium moves around the inner guide tube in sliding contacting motion. Rollers are mounted at each end of the guide tube to enable the conveying medium to move smoothly around each end of the guide tube with very little friction. Since the inner guide tube is completely enclosed and sealed inside the flexible conveying medium moving around it, it can be permanently lubricated such that the sliding friction is almost zero.

Since the thin-walled moving conveying medium moves in sliding contact with the inner guide tube, its outer surface has a cylindrical shape identical to the shape of the inner guide tube. Thus, the surface is essentially equal to the surface of the inner guide tube except that it is moving in the longitudinal direction parallel to the central longitudinal axis of the guide tube. That portion of the medium adjacent to the outer surface of the guide tube moves in one direction and that portion adjacent to the inner surface of the guide tube moves in the opposite direction.

By moving the conveyor and simultaneously moving the wrapping wheels around the conveyor, sheets of wrapping material are wrapped firmly onto the moving outer conveying surface of the tubular conveyor thereby forming a rigid continuous-walled multi-layer tubular structure with an inside diameter equal to the outside diameter of the conveyor. The wrapping material is mounted in cartridges that can be easily replaced with full cartridges when the wrapping material is exhausted. Thus, the resulting tubular structure can have any desired length. The layers of wrapping material are bonded to each other as they are laid by liquid resin thus creating a super-strong laminated wall with any desired thickness. The wall thickness is determined by the ratio of rotational speed of the wrapping wheels to the longitudinal speed of the tubular conveyor. A large ratio will generate a thick-walled structure with many layers of wrapping material, and a low ratio will generate a thin-walled structure with relatively few layers.

The wrapping process is accomplished automatically by electric motors. Straight cylindrical structures are obtained by using a straight guide tube, and curved toroidal structures are obtained by using a slightly curving guide tube.

Since the sheets of wrapping material are rolled into spools with very high packing density, it is possible to construct structures with very large dimensions with relatively few trips into orbit to deliver the wrapping material. For example, straight continuous cylindrical beams a few centimeters in diameter but several kilometers long will be easy to construct, as well as the hull of huge torodial space stations with any desired diameter.

DRAWINGS

These and other advantages and features of the invention will be apparent from the disclosure, which includes the specification with the foregoing and ongoing description, the claims, and the accompanying drawings wherein:

FIG. 6 illustrates the invention in the process of manufacturing a long cylindrical structure; and FIG. 7 illustrates the invention in the process of manufacturing a large toroidal hull for a space station.

DESCRIPTION OF THE PREFERRED EMBODIMENT

In comparison with the previously mentioned automatic orbital construction machine (U.S. Pat. No. 4,730,797), the major design innovation of the present machine is the utilization of a tubular conveyor as a firm wrapping surface instead of an inflatable surface. Since this substitution results in a vastly improved machine and operating method, it is important to understand the unique operating principles and features of tubular conveyors.

Figure 1:
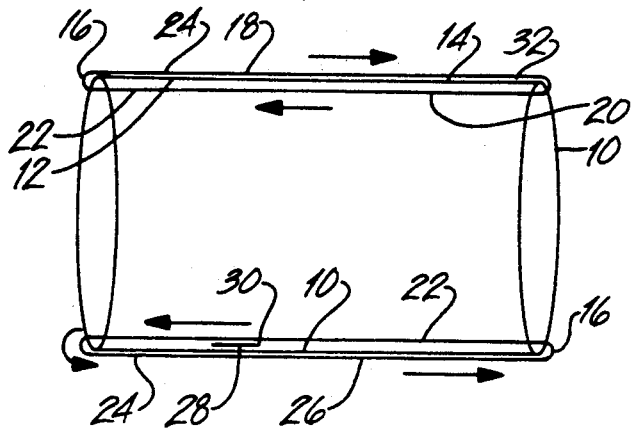
FIG. 1 is a schematic longitudinal cross-section illustrating the basic operating principles of a tubular conveyor.
Figure 2:
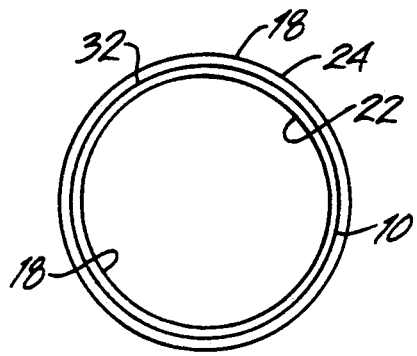
FIG. 2 is a schematic transverse cross-section of FIG. 1.

The tubular conveyor was invented in 1984 (U.S. Pat. No. 4,601,389) and is essentially a rigid tube or pipe (straight or curved) with flexible moving walls. It provides a means for transporting non-fluid bulk material through an enclosed duct in any direction. FIGS. 1 and 2 are schematic longitudinal and transverse cross-sections, respectively, of a tubular conveyor illustrating the basic design and operating principles.

Referring to FIGS. 1 and 2, the basic design of a tubular conveyor comprises a fixed cylindrical guide tube 10 with smooth inner 12 and outer 14 surfaces. A plurality of rollers 16 are mounted around each end of the guide tube 10. The guide tube 10 is completely enclosed within an endless thin-walled flexible conveying medium 18 that moves longitudinally in sliding contact continuously around the guide tube 10 over the rollers 16. The conveying medium 18 is constructed with elastic material to enable it to move around the guide tube 10 over the rollers 16 hugging its walls without tearing. The moving duct-like conveying surface 20 is represented by the inner surface 22 of the conveying medium 18, and the carrying run 24 is represented by the outer surface 26 moving in the opposite direction. Unlike ordinary belt conveyors, the material moving through a tubular conveyor is completely enclosed by the conveying surface which forms the duct.

The moving surface 18 follows the rigid inner guide tube 10 by a plurality of relatively small sliders 28 that are attached to and protrude a small distance from the inside portion of the moving surface 18. These sliders 28 ride snugly inside a plurality of relatively narrow parallel guide slots 30 that extend longitudinally around both sides of the inner guide tube 10. The sliders moving in the guide slots also constrain the moving surface 18 to moving in a strictly longitudinal direction around the inner guide tube 10.

Figure 3:
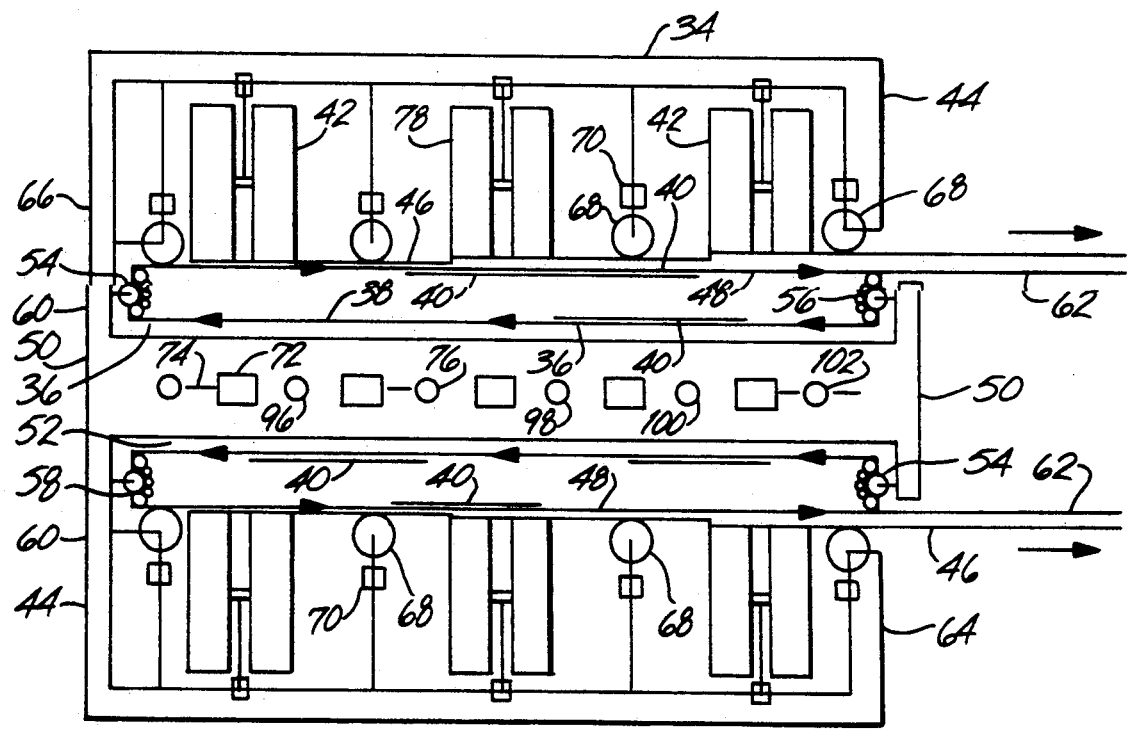
FIG. 3 is a schematic longitudinal cross-section illustrating the design and construction of the automatic construction machine.

Since the inside region 32 of the moving surface 18 is separated from the outside environment, the inside components can be hermetically sealed and permanently lubricated with lubricating fluid that never needs to be replaced. Thus, the sliding friction between the guide tube 10 and the inside walls of the moving surface 18 will always remain very low. Although tubular conveyors are used for transporting bulk material from one point to another on the inside duct-like conveying surface 22, it is the moving outside cylindrical surface 24 (the carrying run) that will be utilized in the present invention. FIG. 3 is a schematic longitudinal cross-section of the automatic construction machine 34. Basically, the machine 34 comprises three subsystems: (1) a relatively short cylindrical tubular conveyor 36 with an endless flexible conveying surface 38 moving longitudinally around a fixed double-walled cylindrical guide tube 40; (2) a plurality of wrapping machines 42 mounted in pairs on a stationary outer support structure 44 that rotate transversely around the tubular conveyor 36 wrapping long thin flexible sheets of high-strength wrapping material 46 onto the moving outer surface 48 of the tubular conveyor 36; and (3) an inner central support structure 50 extending along the inner duct 52 of the tubular conveyor 36 attached to the outer support structure 44 that holds the moving tubular conveyor 36 in a fixed position while the moving surface 38 moves longitudinally around the inner guide tube 40.

The tubular conveyor 36 is held in a fixed position between the outer support structure 44 and inner support structure 50 by a plurality of wheels 54 mounted on each end of the central support structure 50 that hold each end of the tubular conveyor 36 by rolling over the moving surface 38 and exerting an inward force. A plurality of inner rollers 56, mounted at each end of the central guide tube 40, force the moving surface 38 outward against the outward supporting wheels 54 that are pushing inward. The path 58 of the flexible moving surface 38 between the wheels 54 and rollers 56 is concave around the larger guide wheels 54, thereby enabling the guide wheels 54 to hold the tubular conveyor 36 in a fixed position by pushing inward from both ends of the conveyor 36 while the flexible surface 38 continuously moves around the inner guide tube 40. (The concave engagement between the outside guide wheels 54 and the inside rollers 56 prevent the conveyor from moving up and down or laterally between the inner support structure 50 and outer support structure 44.)

The inner central support structure 50 is connected to the outer support structure 44 by a plurality of connecting beams 60 mounted on one side of the tubular conveyor. Since the machine 34 continuously manufactures the tubular structure 62 that comes out of one end 64 of the machine 34 (the end of the machine), the connection between the inner structure 50 and the outer structure 44 via the connecting beams 60 can only be accomplished from one end 66 of the machine 34 (the beginning of the machine). Thus, a guide tube (10) and conveying medium (18) form a rigid mandrel on which the wrapping machine (42) wraps material (46) to form a rigid sleeve or tube (62).

The endless moving surface 38 of the tubular conveyor 36 is moved longitudinally around the guide tube 40 by a plurality of electrically driven traction wheels 68 mounted on the outer support structure 44. These wheels 68 are driven by electric motors 70 energized by a large bank of electric batteries 72 mounted on the inner support structure 50 via electric cables 74. The motors 70 are variable speed motors controlled by a central computer 76 that enables the conveyor 36 to move at a predetermined speed. Since the wheels 68 are mounted 360° completely around the conveyor 36, they are designed to exert a significant inward force on the moving outer conveying surface 48 thereby making possible considerable tractive force.

Figure 4:
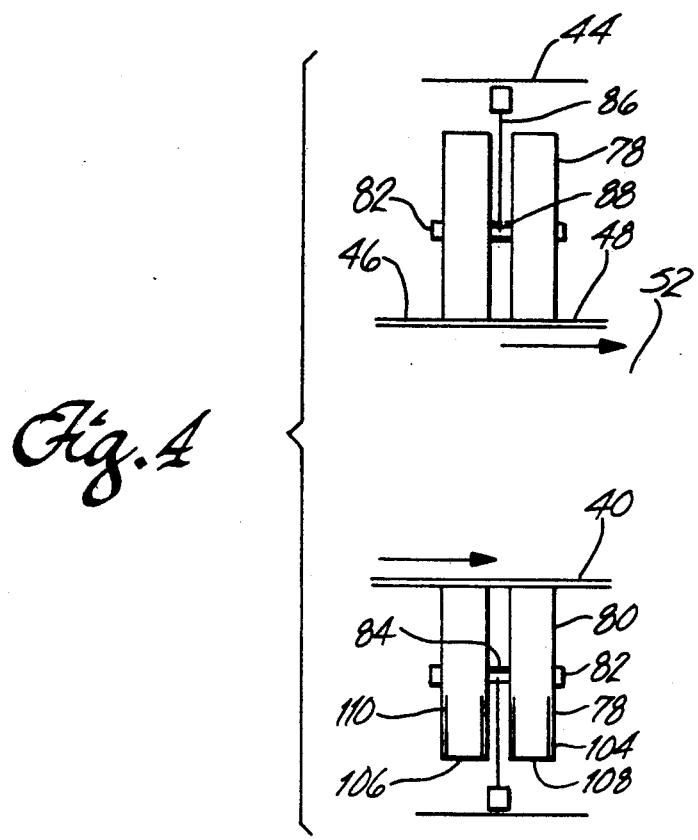
FIG. 4 is a schematic longitudinal cross-section of a pair of wrapping machines.
Figure 5:
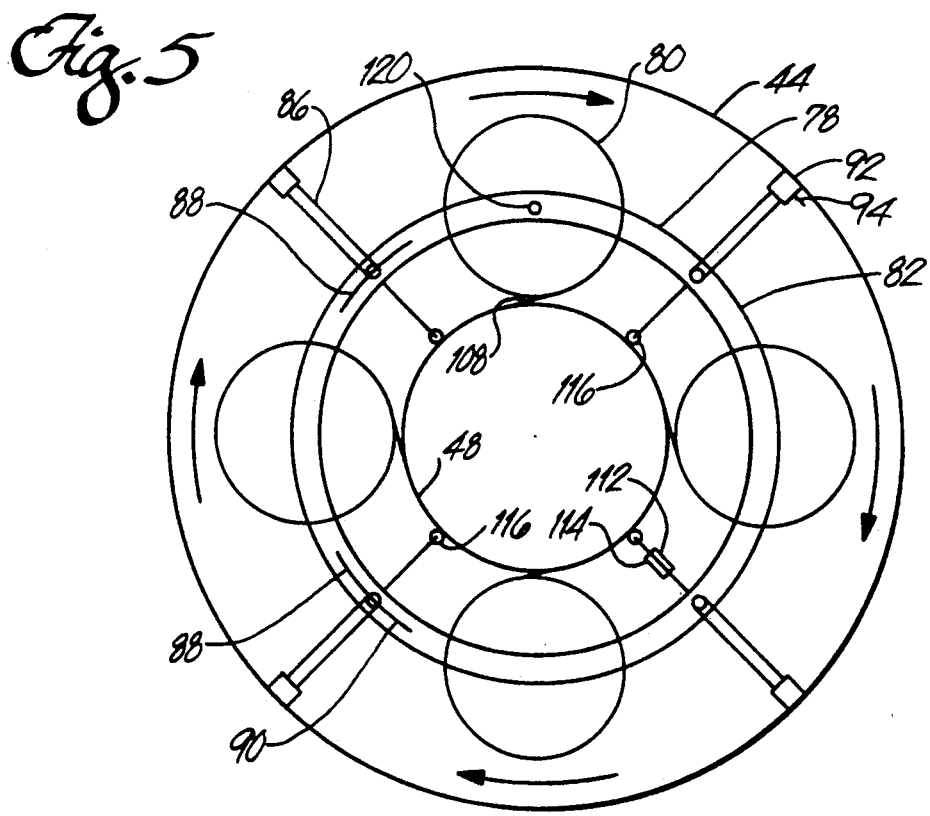
FIG. 5 is a schematic transverse cross-section of FIG. 4.

FIGS. 4 and 5 are schematic longitudinal and transverse cross-sections of a pair of wrapping machines 78, each comprising four individual wrapping wheels 80. The wrapping machines are mounted on the outer supporting structure 44 and rotate around the outer moving surface 48 of the tubular conveyor 36 in opposite directions so that the net torque exerted on the moving surface 48 is zero. The machine shown in FIG. 3 has three pairs of wrapping machines 78 containing a total of 24 wrapping wheels.

Referring to FIGS. 4 and 5, the wrapping wheels 80 are mounted on each wrapping machine 78 between two parallel, spaced-apart rings 82. A plurality of relatively small longitudinal support beams 84 connect the rings 82 together and maintain them in a spaced-apart configuration.

The wrapping machines 78 are rotated around the conveyor surface 48 by a system of rotating drive shafts 86 that engage sprockets 88 mounted on circular flanges 90 attached to adjacent rings 82. The drive shafts 86 are rotated by a plurality of variable-speed motors 92 energized by the bank of batteries 72 mounted on the inner support structure 50 via electric cables 94. The speed of rotation of the wrapping machines 78 is controlled by the central control computer 76.

In addition to the large bank of batteries 72, the central support structure 50 also contains a plurality of reaction wheel gyros (RWG's) 96 for maintaining the machine with a certain attitude while it is manufacturing the tubular structure 62. Various accelerometers 98, back-up computers 100, and radio transmitter-receiving control systems 102 are also mounted on the central structure 50.

Each wrapping machine 78 (FIGS. 4,5) is equipped with four receptacles 104 mounted around the circumferential periphery at 90° intervals between the two supporting rings 82. A spool 106 containing a thin continuous sheet of high-strength wrapping material 108 having a certain width (that could range from a centimeter for tubular beams to over a meter for toroidal space stations) is mounted in the form of a plug-in cartridge 110 and is loaded into each receptacle 104. The spool 106, cartridge 110 and receptacle 104, comprise important components of the wrapping wheel 80. Four other replaceable cartridges 112, containing a high-strength bonding agent 114 (such as liquid resin) is loaded into four automatic bonding dispensing systems 116, located adjacent each spool cartridge 110. The bonding fluid is automatically applied as a thin film on the upper side of each sheet of wrapping material when the wrapping machine 78 rotates around the outer moving surface 48. Thus, as each wrapping machine 78 rotates around the outer moving conveying surface 48, four continuous sheets of high-strength wrapping material 108 are automatically wrapped around, and bonded to each other. No bonding material is applied to the moving surface 48. The wrapping material is simply wrapped around the surface 48 in the form of a tight, multi-layer sleeve that is continuously constructed by the wrapping wheels and continuously moved longitudinally away from the machine by the moving conveying surface 48. The tension in each sheet 108 is adjusted by automatic computer controlled tension adjusting systems 120 such that the net torque generated on the conveyor surface 48 by each pair of machines 78 is zero. (Since the wrapping machines in each pair rotate in opposite directions, the torque generated on the surface by tension in the wrapping material cancel each other.)

For the embodiment shown in FIG. 3, the rotating wrapping machines will automatically construct a super-strong laminated cylindrical wall with 24 separate spools of wrapping material unrolling on the moving surface 48 simultaneously. The final wall thickness of the structure 62 coming out of the machine will depend upon the thickness of each sheet and the ratio of the rotational speed of the wrapping machines to the translational speed of the tubular conveyor. For example, if a thick-walled structure is desired, the machine will be operated with a high rotational speed relative to the conveyor speed so that the wall will be many layers thick. If a thin wall structure is desired, some of the wrapping machines can be turned off, and the rotational speed of the operating units will be slow relative to the conveyor speed.

The inside diameter of the structure will be equal to the outer diameter of the conveying surface 48 (which could range from a few centimeters for tubular beams to several meters for space stations). If the guide tube 40 is straight, the resulting structure will be straight and could have any length desired. As soon as the cartridges of wrapping material and bonding material are exhausted, they are simply removed by astronauts and replaced by full cartridges transported to orbit by launch vehicles. The process of replacing the various cartridges with full cartridges will be relatively easy because they are designed to slip out of, and into the corresponding receptacles without requiring any careful prealignment or other tedious procedures.

An important operating design feature of the present orbital construction machine that distinguishes it from the above mentioned prior design (U.S. Pat. No. 4,730,797) is the fact that the moving outer surface 48 being wrapped cannot be depressed inward (deformed from a perfect cylindrical cross-section) by the driving wheels 68 or by tension in the wrapping material 108 because the surface 48 is backed up by the very strong cylindrical guide tube 40 of the tubular conveyor 36. Moreover, this machine is much easier to operate because it does not have to move over any predetermined path around a gas filled surface. Aside from its orbital velocity, the machine remains stationary. The desired wall thickness of the structure 62 is simply fed into the central control computer 76 as input data which computes the required speed ratio to generate the desired wall thickness. The computer automatically controls the speed of the motors 70, 92 to automatically produce the required ratio so that the structure 62 coming out of the machine has the precise thickness desired. The attitude control moment gyros keep the machine fixed in space relative to a near-by manned support vehicle.

FIG. 6 illustrates the orbital construction machine 34 in the process of manufacturing a straight continuous cylindrical structure 122 with any desired length. FIG. 7 illustrates the construction machine 34 in the process of manufacturing a very large toroidal structure 124 for a space station. As described above, in the case of toroidal structures, the guide tube 40 of the tubular conveyor 36 has a radius of curvature equal to the major radius of the toroidal structure.

Referring to FIG. 3, the connecting beams 60 between the inner structure 50 and the outer structure 44 of the construction machine 34 are designed to be detachable. Consequently, when a torodial structure 124 is almost finished as is shown in FIG. 7, the inner structure 50 can be disconnected, and the beginning of the toroidal structure 126 can be fed back into the wrapping machines and thereby joined to the end of the structure making the completed structure an endless super-strong torus. A system of back-up batteries, control computers, attitude control moment gyros, etc., are provided on the outer structure 44 to operate the wrapping wheels without the inner structure 50.

When the machine 34 is used to construct long cylindrical beams, all of the wrapping wheels could be loaded with the same material. For example, suppose that a 1,000 m long cylindrical beam with an inside diameter of 1.0 m and a wall thickness of 0.5 cm made of aluminum alloy with a density of 2.7 gm/cm$^3$ is required. The total mass of the beam would be 42,412 kg. If the machine illustrated in FIG. 3 is used for the construction, each of the 24 wrapping wheels would be loaded with a 1,767 kg continuous aluminum sheet. If the conveyor speed is set for 1.0 m/sec, the machine would construct the beam in 1,000 sec or 16.67 minutes.

When the machine is used to construct toroidal space stations (see U.S. Pat. No. 4,730,797) the wrapping wheels could contain sheets of various material. For example, some wheels could be loaded with sheets of KEVLAR, others loaded with sheets of aluminum alloy, others with sheets of boron (for radiation shielding) and others with sheets of carbon composite material. The resulting structure will be composed of all these sheets bonded together to form a super-strong laminated-wall structure that could have any desired thickness and size. After the machine is assembled and loaded with the wrapping material, it could proceed to automatically construct the hull of the structure without any human assistance and, it will construct the structure rapidly with a degree of precision far beyond anything that could be achieved by astronauts assembling the structure one section at a time by conventional construction methods in an orbiting construction center.

Many different embodiments of the invention are possible. For example, the moving surface 38 could be composed of a plurality of endless belts instead of a single elongated toroidal surface, The guide tube 40 could have an elliptical cross-section instead of a circular cross-section. It could also have a square or triangular cross-section. Since the transverse cross-section of the resulting structure is equal to the external transverse cross-section of the guide tube 40, the machine will be capable of making tubular structures with circular, square, triangular, and many other cross-sections. Equilateral triangular cross-sections would be very useful in the construction of long beams.

In another embodiment, the outer structure 44 is not physically connected to the inner structure 50 that supports the conveyor, It could simply operate around the conveyor keeping the conveyor centered inside (via the traction wheels 68) by a plurality of sensors.

Still other embodiments of the invention could replace the inner cylindrical guide tube 40 with a plurality of rollers.

In another embodiment, the wrapping wheels 80 do not have to rotate around the conveyor 36. The conveyor can itself be rotated along its longitudinal axis while the conveying surface 38 is moving simultaneously. In this design, the wrapping wheels can remain in fixed positions relative to the supporting structure 44 while the flexible wrapping material unwinds on the rotating conveyor surface 48 thereby forming a continuous tubular structure.

The invention could also be used to construct structures on the surface of celestial bodies and is not limited to orbital construction. It could also be used for manufacturing relatively small ultra high-pressure tubular conduits or high-pressure cylindrical vessels for industry. Another application would be in the manufacture of cylindrical pipes or conduits for general construction or large civil engineering projects. It could also be used for constructing large cylindrical sections of aircraft fuselage or other vehicles. Still other applications would be in the construction of toroidal or cylindrical shaped homes or buildings on earth or on other celestial bodies.

As various other changes and modifications can be made in the above automatic construction method and operating system without departing from the spirit or scope of the invention, it is intended that all subject matter contained in the above description or shown in the accompanying drawings should be interpreted as illustrative and not in a limiting sense.

What is claimed is:

1. A method for constructing a continuous-walled structure comprising the steps of:
   mounting a wrapping apparatus on a rigid core;
   surrounding at least a portion of the core with a conveyor means having a flexible endless conveying medium with an external carrying run moving in one direction and an internal return run moving in the opposite direction;
   wrapping wrapping material circumferentially around a portion of the external carrying run for forming a continuous-walled structure;
   moving the continuous-walled structure longitudinally within the wrapping apparatus by said conveying medium; and
   discharging the continuous-walled structure off an end of the carrying run.

2. A method as recited in claim 1 wherein the wrapping step comprises wrapping a continuous sheet material around a portion of the conveying medium and adhering together overlapping layers of the sheet material for building a rigid continuous-walled structure.

3. A method as recited in claim 1 wherein the wrapping step comprises wrapping a fibrous material around a portion of the conveying medium and adhering adjacent fibers together for forming a rigid continuous-walled structure.

4. A method as recited in claim 1 wherein the wrapping step comprises:
   mounting the wrapping material on a wrapping wheel; and
   rotating the wrapping wheel around a portion of the conveying means thereby dispensing wrapping material on said conveying run.

5. A method as recited-in claim 1 wherein the wrapping step comprises wrapping multiple overlapping layers of wrapping material around a portion of the conveying means; and
   bonding overlapping layers together for building a rigid multilayer laminated wall.

6. A method for building a continuous rigid tube comprising the steps of:
   wrapping a wrapping material around a hollow mandrel having a beginning and an end;
   adhering successive layers of wrapping material together for building a rigid tube; and
   continuously moving the tube off of the end of the mandrel, the moving step comprising:
   moving the outer surface of the mandrel toward the end;
   moving the outer surface around the end to become the inner surface of the hollow mandrel; and
   moving the inner surface of the mandrel toward the beginning of the mandrel as a continuous belt.

7. A method as recited in claim 6 wherein the belt comprises a substantially closed toroidal shape and further comprising wrapping the belt around a hollow guide tube between the outer surface of the mandrel and the hollow inner surface of the mandrel.

8. A method as recited in claim 6 further comprising placing the wrapping material on a material dispensing wheel and rotating the wheel around the circumference of the mandrel.

9. A method as recited in claim 8 comprising placing wrapping material on a plurality of wheels spaced apart longitudinally along the length of the mandrel and rotating half of the wheels in one direction around the mandrel and the other half of the wheels in the opposite direction around the mandrel for producing substantially zero net rotational torque on the mandrel.

10. A method as recited in claim 8 comprising placing wrapping material on a plurality of wheels spaced apart circumferentially around the mandrel and rotating all of the wheels around the mandrel simultaneously for depositing multiple layers of wrapping material on the mandrel.

11. A method for constructing a continuous-walled structure comprising the steps of:
   moving a flexible endless conveying medium having an outer carrying run moving in one direction, and an inner return run moving in the opposite direction around a rigid core;
   wrapping a portion of said outer carrying run with wrapping material to build a continuous-walled structure by wrapping successive layers of said material; and
   continuously moving said structure by said conveying medium.

12. A method as recited in claim 11 wherein said wrapping material comprises at least one long flexible sheet.

13. A method as recited in claim 12 wherein said step of wrapping said sheet around said conveying medium comprises the steps of:
   mounting said sheet of wrapping material on a wrapping wheel; and
   moving said wrapping wheel around said endless conveying medium thereby unwinding said sheet on said moving conveying medium which is continuously moved away.

14. A method as recited in claim 13 further comprising the step of bonding said sheet together in successive layers by dispensing bonding material.

15. A method as recited in claim 13 further comprising the step of adding more wrapping material to said wrapping wheel after said material is exhausted to form a continuous structure having unlimited dimensions.

16. A method as recited in claim 14 further comprising the steps of:
   wrapping multiple sheets of wrapping material around said conveying surface; and
   bonding adjacent layers to each other to build a multi-layered laminated wall.

17. A method as recited in claim 11 wherein said flexible endless conveying medium is a closed toroidal surface moving around an inner guide tube, said surface having an outer tubular run moving in one direction adjacent said guide tube and an inner run moving in the opposite direction.

18. A method for constructing a structure comprising the steps of:
   moving a flexible endless conveying surface having an outer run moving in one direction and an inner return run moving in the opposite direction;
   mounting a wrapping machine containing flexible wrapping material around a portion of said moving outer run; and
   wrapping said wrapping material around a portion of said outer run while said outer run is moving by means of said wrapping machine to construct a continuous-walled structure by a successive-layer wall-building process that is continuously moved past said wrapping machine by said conveying surface.

19. A method as recited in claim 18 further comprising the steps of:
   varying the speed of said conveying surface; and
   varying the speed said wrapping material is wrapped around said moving outer conveying surface to vary the wall thickness of said structure.

20. A method as recited in claim 18 further comprising the step of adding more wrapping material to said wrapping machine after said material is exhausted so that said structure can have unlimited dimensions.

21. An apparatus for constructing a continuous-walled tubular structure comprising:
   a guide tube;
   a flexible conveying medium mounted around the guide tube substantially encompassing the guide tube, the conveying medium having a carrying run on the outside of the tube and a return run on the inside of the tube;
   means for driving the conveying medium longitudinally around the guide tube with the carrying run moving toward one end of the guide tube and the return run moving toward the opposite end of the guide tube; and
   means for wrapping a wrapping material circumferentially around the outside of the moving carrying run of the conveying medium for building a tubular structure around the moving conveying medium.

22. An apparatus as recited in claim 21 wherein the conveying medium comprises a single toroidal belt completely enclosing the guide tube.

23. An apparatus as recited in claim 21 wherein the wrapping means comprises:
   a plurality of material dispensing wheels at circumferentially spaced locations around the outside of the guide tube; and
   means for rotating the wheels around the axis of the guide tube for dispensing wrapping material from each wheel for overlapping wrapping material from an adjacent wheel.

24. An apparatus as recited in claim 21 comprising:
   a plurality of material dispensing wheels at longitudinally spaced locations around the outside of the guide tube;
   means for rotating half of the wheels around the guide tube in one direction for dispensing wrapping material toward the conveying medium; and
   means for rotating the other half of the wheels around the guide tube in the opposite direction for dispensing wrapping material toward the conveying medium and producing substantially zero net rotational torque on the guide tube.

25. An apparatus for constructing a structure in orbit comprising:
   a hollow conveyor means having a flexible endless conveying medium with an outer carrying run moving in one direction and an inner return run moving in the opposite direction;
   flexible wrapping material; and means for wrapping said flexible wrapping material over a portion of the surface of the outer carrying run of said endless conveying medium such that said structure is constructed by a successive layer wall-building process that is continuously moved past said wrapping means by said conveyor means.

26. An apparatus as set forth in claim 25 further comprising:
   a wrapping wheel;
   means for mounting said flexible wrapping material on said wrapping wheel; and
   means for moving said wrapping wheel around said conveyor means thereby wrapping said surface with said wrapping material.

27. An apparatus as set forth in claim 26 further comprising means for adding additional wrapping material in said wrapping wheel after said wrapping material is exhausted so that said structure can be constructed with unlimited dimensions.

28. An apparatus for constructing a structure comprising:
   an endless conveying surface having an outer carrying run moving in one direction and an inner return run moving in the opposite direction;
   means for moving said endless conveying surface;
   a sheet of wrapping material; and
   means for wrapping said wrapping material on a portion of said outer run of said endless conveying surface so that said structure is constructed by a continuous multiple-layer wall-building process that is moved along by said conveying surface.

29. An apparatus as set forth in claim 28 further comprising means for bonding successive layers of said wrapping material to obtain a strong laminated wall structure.

30. An apparatus as set forth in claim 29 further comprising:
   wrapping wheel means;
   means for mounting said wrapping material on said wrapping wheel means; and
   means for rotating said wrapping wheel means around a portion of said conveying surface to wrap said material onto a portion of said conveying surface.

31. An apparatus as set forth in claim 30 further comprising:
   means for varying the speed of said endless conveying surface; and
   means for varying the rotational speed of said wrapping wheel so that the wall thickness of said structure can be varied.

32. An apparatus as recited in claim 21 wherein the conveying medium comprises a plurality of parallel belts collectively surrounding the guide tube, each belt having a carrying run on the outside of the tube and a return run on the inside of the tube.

* * * * *